United States Patent
Augustine et al.

(10) Patent No.: US 6,986,540 B2
(45) Date of Patent: Jan. 17, 2006

(54) BED SYSTEM FOR A PICKUP TRUCK

(75) Inventors: Robb Louis Augustine, Dublin, OH (US); David Michael Edwards, Marysville, OH (US)

(73) Assignee: Honda Motor Company, Ltd., Tokyo (JP)

( * ) Notice: Subject to any disclaimer, the term of this patent is extended or adjusted under 35 U.S.C. 154(b) by 321 days.

(21) Appl. No.: 10/663,269

(22) Filed: Sep. 16, 2003

(65) Prior Publication Data

US 2005/0057074 A1  Mar. 17, 2005

(51) Int. Cl.
  *B62D 33/02*  (2006.01)
  *B60R 13/01*  (2006.01)

(52) U.S. Cl. .................. 296/39.1; 296/181.3

(58) Field of Classification Search ........... 296/39.1, 296/39.2, 181.1, 181.2, 181.3, 186.1; D12/98
  See application file for complete search history.

(56) References Cited

U.S. PATENT DOCUMENTS

| | | | | |
|---|---|---|---|---|
| 1,579,388 A | * | 4/1926 | Palmer | 296/180 |
| 2,803,491 A | * | 8/1957 | Brown | 296/39.2 |
| 2,886,374 A | * | 5/1959 | Meats | 296/181.7 |
| 3,163,463 A | * | 12/1964 | Femrite | 296/183.1 |
| 4,279,439 A | * | 7/1981 | Cantieri | 296/39.2 |
| 4,333,678 A | * | 6/1982 | Munoz et al. | 296/39.2 |
| 4,453,875 A | * | 6/1984 | Johnson, Sr. | 414/304 |
| 4,474,404 A | * | 10/1984 | Hagenbuch | 296/182.1 |
| 4,836,600 A | | 6/1989 | Miyazaki et al. | 296/193.07 |
| 4,890,874 A | * | 1/1990 | Davis | 296/39.2 |
| 4,911,493 A | * | 3/1990 | Muirhead | 296/39.2 |
| 4,944,612 A | | 7/1990 | Abstetar et al. | 296/39.2 |
| 4,986,590 A | * | 1/1991 | Patti et al. | 296/39.2 |
| 4,998,769 A | | 3/1991 | Johnson et al. | 296/183.1 |
| 5,505,512 A | * | 4/1996 | Martindale et al. | 296/39.2 |
| 5,553,906 A | | 9/1996 | Kunz | 296/29 |
| 5,660,427 A | * | 8/1997 | Freeman et al. | 296/190.08 |
| 5,755,481 A | * | 5/1998 | Emery | 296/39.1 |
| 5,806,909 A | * | 9/1998 | Wise | 296/39.1 |
| 5,887,931 A | * | 3/1999 | Bills et al. | 296/39.1 |
| 6,059,343 A | * | 5/2000 | Emery | 296/39.2 |
| 6,120,078 A | * | 9/2000 | Smyl | 296/39.1 |
| 6,142,549 A | * | 11/2000 | Clare et al. | 296/37.6 |
| 6,237,211 B1 | | 5/2001 | Clare et al. | 29/434 |
| 6,237,980 B1 | | 5/2001 | Miles et al. | 296/39.2 |
| 6,290,278 B1 | | 9/2001 | Loveland | 296/39.1 |
| 6,439,649 B1 | * | 8/2002 | Lorenzo et al. | 296/181.3 |
| 2002/0117873 A1 | | 8/2002 | Lorenzo et al. | |
| 2002/0149223 A1 | * | 10/2002 | Saucier et al. | 296/39.2 |

FOREIGN PATENT DOCUMENTS

| | | | | |
|---|---|---|---|---|
| GB | 2257666 A | * | 1/1993 | 296/39.2 |
| JP | 62012478 A | * | 1/1987 | 296/39.2 |

* cited by examiner

*Primary Examiner*—D. Glenn Dayoan
*Assistant Examiner*—Paul Chenevert
(74) *Attorney, Agent, or Firm*—Dinsmore & Shohl LLP (57) ABSTRACT

A bed system for a pickup truck includes a first member adapted for securement to a first support component associated with a truck bed. The first member has a first surface for contacting cargo and a first edge portion extending at least partially along the periphery of the first member. A second member is adapted for securement to a second support component associated with a truck bed. The second member has a second surface for contacting cargo and has a second edge portion extending at least partially along the periphery of the second member. At least a portion of the second edge portion is oriented in at least a partially overlapping spaced relationship to at least a portion of the first edge portion at an interface. A cushioning element is located between the overlapping first and second edge portions at the interface. The cushioning element is resiliently compressible and permits relative movement between the first and second edge portions at the interface.

25 Claims, 10 Drawing Sheets

BED SYSTEM FOR A PICKUP TRUCK

TECHNICAL FIELD

The present invention relates to a bed system for integration into a pickup truck. More particularly, the bed system can comprise a plurality of members that can directly contact cargo within the bed, but that can be spaced from one another in at least a partially overlapping relationship.

BACKGROUND OF THE INVENTION

Pickup trucks are commonly used to facilitate transportation of cargo items from one location to another, such as through placement of cargo items in a bed of the pickup truck. While pickup trucks are available in many sizes and configurations, a typical pickup truck includes a truck bed having a cargo carrying floor that can support cargo, such as lumber, rocks, groceries and/or other items. A typical truck bed also includes side walls to help restrain cargo within the bed. In many conventional truck beds, the cargo carrying floor and side walls are integrally provided, and can for example be formed as a single steel assembly and/or provided as a single plastic bed liner assembly. However, such structures can be costly to manufacture and integrate into pickup trucks because of their immense physical size, and must be precisely manufactured to fit the intended truck.

Accordingly, there is a need for a bed system that is relatively inexpensive to manufacture, is relatively simple to install, and that functions adequately to support cargo within a truck bed.

SUMMARY OF THE INVENTION

In accordance with the purposes of the present invention defined herein, a bed system for a pickup truck is provided. In one embodiment, the bed system includes a first member adapted for securement to a first support component associated with a truck bed. The first member has a first surface for contacting cargo and a first edge portion extending at least partially along the periphery of the first member. A second member is adapted for securement to a second support component associated with a truck bed. The second member has a second surface for contacting cargo and a second edge portion extending at least partially along the periphery of the second member. At least a portion of the second edge portion is oriented in at least a partially overlapping spaced relationship to at least a portion of the first edge portion at an interface. A cushioning element is located between the overlapping first and second edge portions at the interface. The cushioning element is resiliently compressible and permits relative movement between the first and second edge portions at the interface.

In another exemplary embodiment of the present invention, a bed system is provided. The bed system includes a first member adapted for securement to a first support component associated with a truck bed. The first member has a first surface for contacting cargo and a first edge portion extending at least partially along the periphery of the first member. A bed floor is adapted for receiving subjacent support from a second support component associated with a truck bed. The bed floor has a second surface for contacting cargo and a second edge portion extending at least partially along the periphery of the bed floor. At least a portion of the second edge portion is oriented in at least a partially overlapping spaced relationship to at least a portion of the first edge portion at an interface. A cushioning element is located between the overlapping first and second edge portions at the interface. The cushioning element is resiliently compressible and permits relative movement between the first and second edge portions at the interface.

In yet another exemplary embodiment of the present invention, a bed system is provided. The bed system includes a left side member adapted for securement to a first support component associated with a truck bed. The left side member has a first surface for contacting cargo and a first edge portion extending at least partially along the periphery of the left side member. A right side member is adapted for securement to a second support component associated with a truck bed. The right side member has a second surface for contacting cargo and a second edge portion extending at least partially along the periphery of the right side member. A bed floor is adapted for receiving subjacent support from a third support component associated with a truck bed. The bed floor has a third surface for contacting cargo and third and fourth edge portions each extending partially along the periphery of the bed floor. At least a portion of the third edge portion is oriented in at least a partially overlapping spaced relationship to at least a portion of the first edge portion at a first interface. At least a portion of the fourth edge portion is oriented in at least a partially overlapping spaced relationship to at least a portion of the second edge portion at a second interface. A first cushioning element is located between the overlapping first and third edge portions at the first interface. The first cushioning element is resiliently compressible and permits relative movement between the first and third edge portions at the first interface. A second cushioning element is located between the overlapping second and fourth edge portions at the second interface. The second cushioning element is resiliently compressible and permits relative movement between the second and fourth edge portions at the second interface.

The bed systems described herein are advantageous for providing a bed system that is relatively inexpensive to manufacture, is relatively simple to install, and that functions adequately to support cargo within a truck bed. Additional embodiments, advantages, and novel features of the invention will be set forth in part in the description that follows, and in part will become apparent to those skilled in the art upon examination of the following or may be learned with the practice of the invention. The advantages of the invention may be realized and attained by means of the instrumentalities and combinations particularly pointed out in the appended claims.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EXEMPLARY EMBODIMENTS

Figure 1:
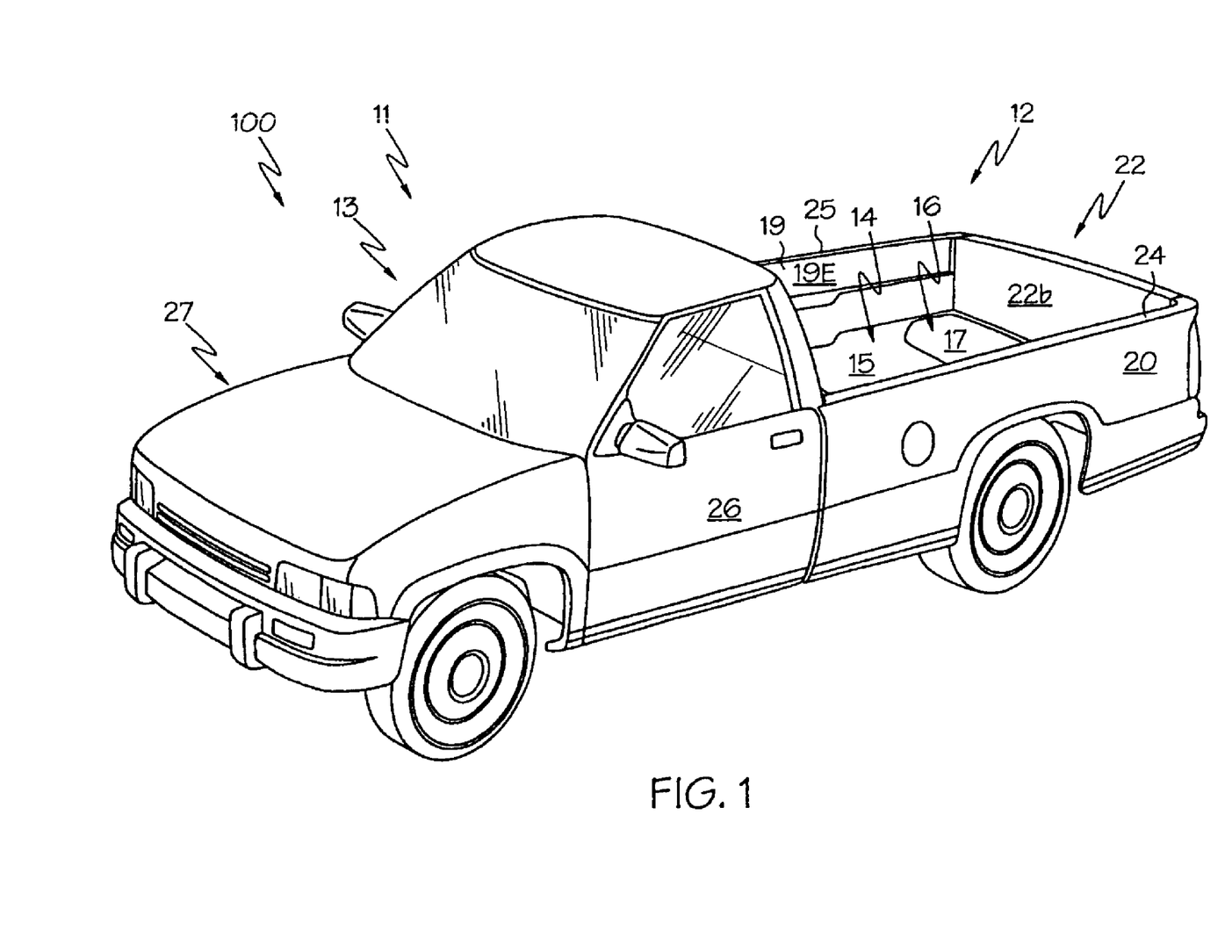
FIG. 1 is a front perspective view of a pickup truck having a bed system in accordance with one exemplary embodiment of the present invention.

Exemplary embodiments of the invention and its operation are hereinafter described in detail in connection with the views and examples of FIGS. 1–10, wherein like numbers indicate the same or corresponding elements throughout the views. As shown in FIG. 1, a pickup truck 100 can include a cab portion 11 having a passenger compartment 13 and an engine compartment 27. Although the passenger compartment 13 is depicted as having only two passenger doors (e.g., 26), it is to be understood that a bed system constructed in accordance with the present invention is suitable for use with virtually any type of pickup truck cab, including for example, an extended cab and a crew cab (e.g., with four passenger doors). The pickup truck 100 can also include a truck bed portion 12 that is configured to hold cargo.

Figure 2:
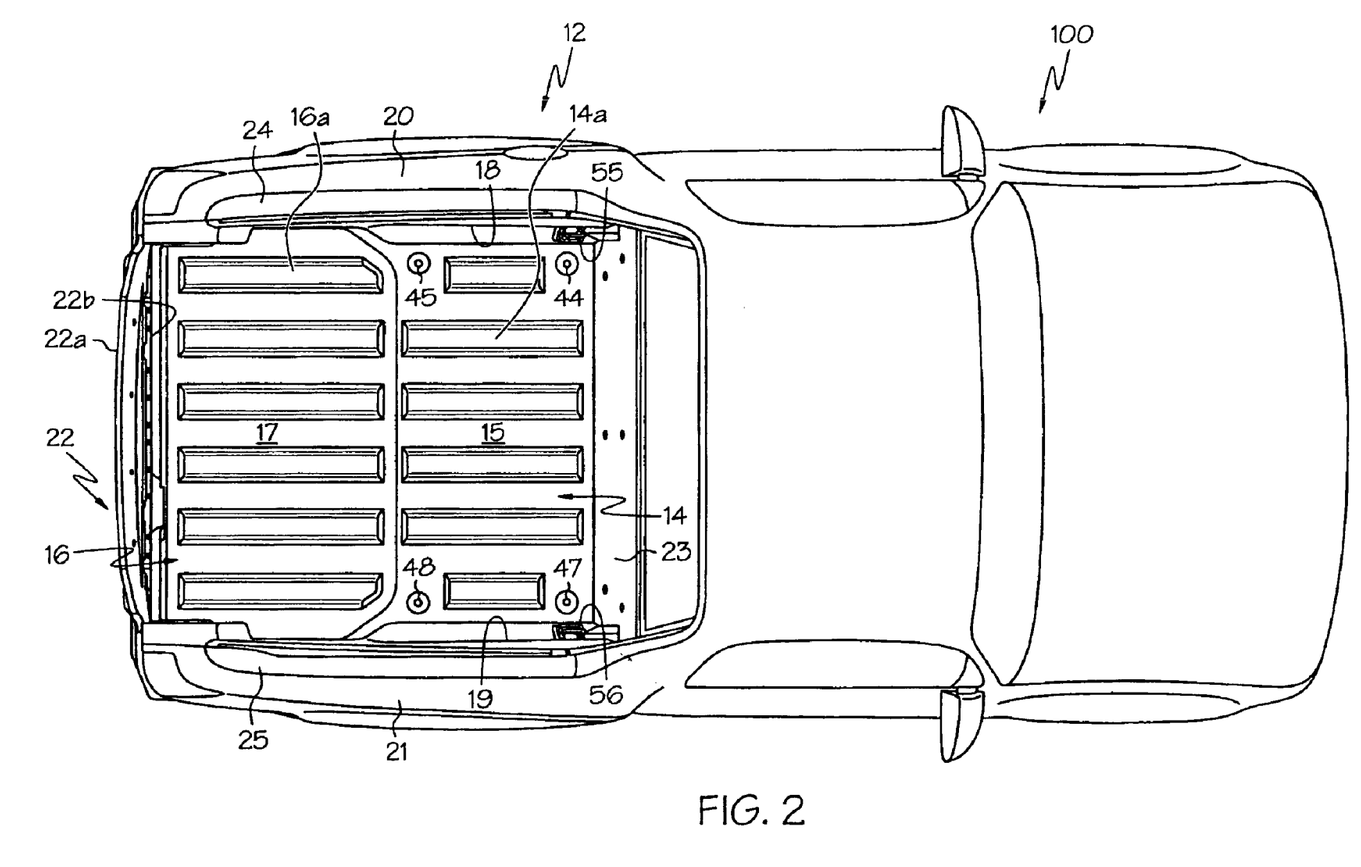
FIG. 2 is a top plan view generally depicting the pickup truck of FIG. 1.

As shown more clearly in FIG. 2, the specifically illustrated truck bed portion 12 is shown to generally include a plurality of outer body components, including a left outer body panel 20, a right outer body panel 21 and a portion (e.g., 22a) of tailgate 22. Such outer body components 20, 21, 22a can be formed from any of a variety components such as steel, aluminum, plastic, fiberglass, composites and/or a combination thereof, or the like. In one exemplary embodiment, one or more outer body components comprise painted steel sheets. In yet a further embodiment, at least one of the outer body components is formed from plastic.

A bed system in accordance with the present invention is suitable for association with any of a variety of specific truck bed configurations, including for example, the truck bed portion 12 as depicted in FIGS. 1–2. The bed system can be secured to one or more support components of the pickup truck 100, and can include a plurality of members and/or other components that are configured to directly contact and/or support cargo within the truck bed 12. More particularly, as shown in FIGS. 1–2, the bed system can include a bed floor 14, a left side member 18, a right side member 19, a headboard member 23, a left bed rail member 24, a right bed rail member 25, and a tailgate member 22b.

Figure 4:
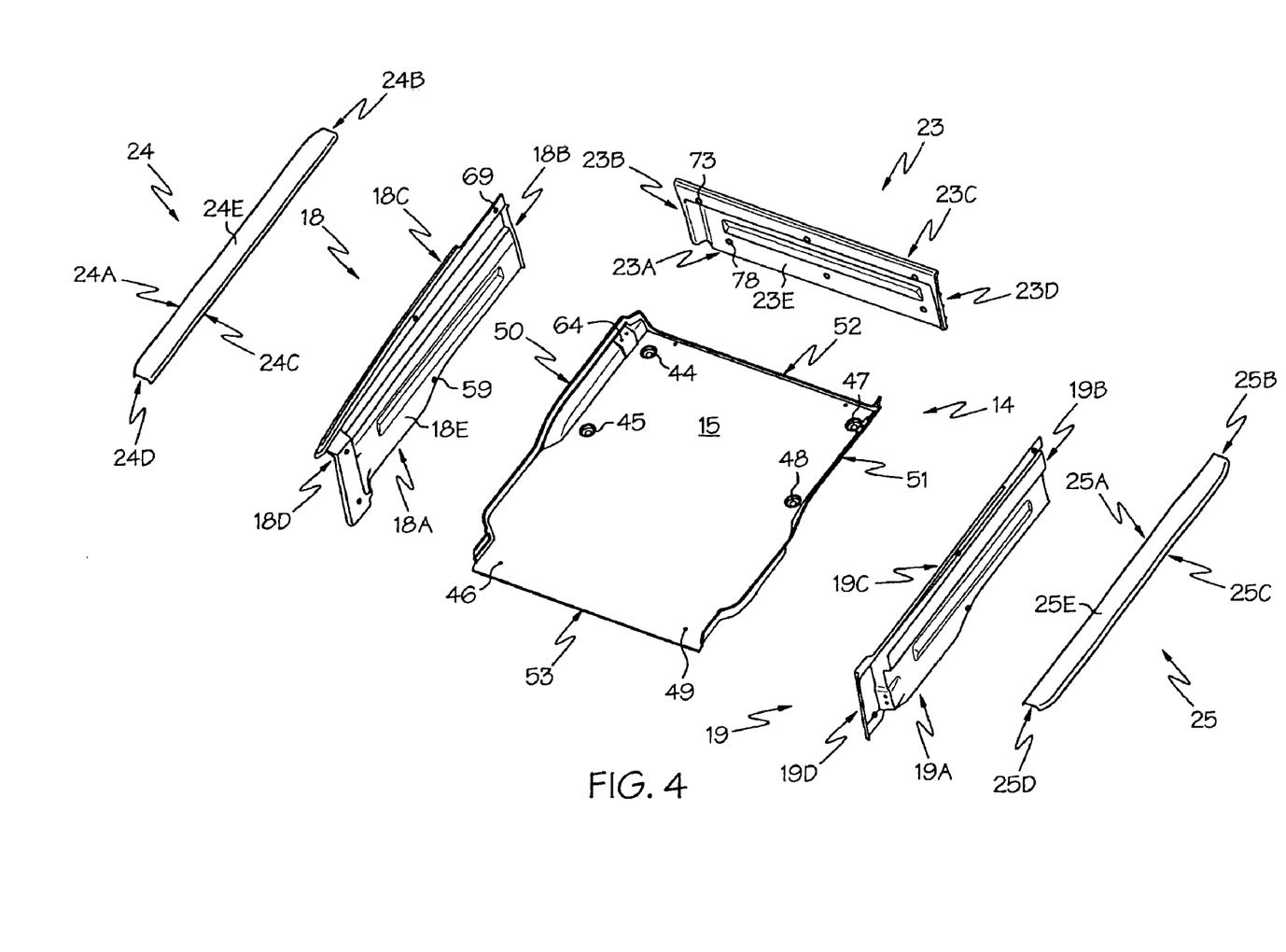
FIG. 4 is an exploded perspective view of selected components of a bed system similar to that depicted in FIG. 2, except that this embodiment lacks a closure member and further lacks certain contours on the bed floor.

The bed floor 14 as depicted in FIGS. 1–2 is shown to include a first support surface 15 for contacting and thereby supporting cargo within the truck bed portion 12. In one embodiment (e.g., as shown in FIG. 4), the bed floor 14 can comprise a single member that provides substantially the entire cargo carrying floor of the truck bed portion 12. However, in alternate embodiments, a plurality of separate members might be configured to each define a respective portion of the cargo carrying floor of the truck bed portion. In certain such alternate embodiments, one or more of the separate members might be configured as a moveable closure member (e.g., cargo lid 16 shown in FIGS. 1–2) to provide selective access to one or more chambers disposed beneath the cargo carrying floor of the truck bed portion 12. Such a closure member, as shown for example in FIGS. 1–2 can include a second support surface 17 for directly supporting cargo within the truck bed portion 12, wherein the second support surface 17 can align substantially coplanarly with one or more of the other surfaces of the cargo carrying floor (e.g., first support surface 15 of the bed floor 14) when the closure member is closed. Furthermore, both the first closure member 16 and the bed floor 14 are shown in FIG. 2 to include raised contours (e.g., 16a and 14a). Although such contours can provide rigidity and/or texture to a cargo carrying floor, it should be understood that an exemplary closure member and/or bed floor might not include any such contours (e.g., as shown in FIGS. 1 and 4). Accordingly, it should be understood that an exemplary bed system in accordance with the present invention can involve many alternate configurations for the cargo carrying floor.

The bed floor 14 can include one or more edge portions extending at least partially along its outer periphery. For example, FIG. 4 depicts the bed floor 14 to include a left edge portion 50, a right edge portion 51, a front edge portion 52, and a rear edge portion 53. Although FIG. 4 depicts each of the left edge portion 50, the right edge portion 51, and the front edge portion 52 as being oriented substantially upwardly, and further depicts the rear edge portion 53 as being substantially unbent, it should be understood that one or more of these edge portions 50, 51, 52, 53 might be oriented differently depending of course upon specific design objectives of an associated truck bed. Accordingly, the edge portion(s) of the bed floor 14 can assume any of a variety of specific configurations as appropriate.

As previously indicated, in addition to the bed floor 14, an exemplary bed system might also include one or more additional members, including for example, a left side member 18, a right side member 19, a headboard member 23, a left bed rail member 24, a right bed rail member 25, and a tailgate member 22b. Although certain of these additional members are depicted in FIGS. 1–2, such members are best portrayed in FIG. 4, and accordingly will now be described in reference thereto.

Figure 3:
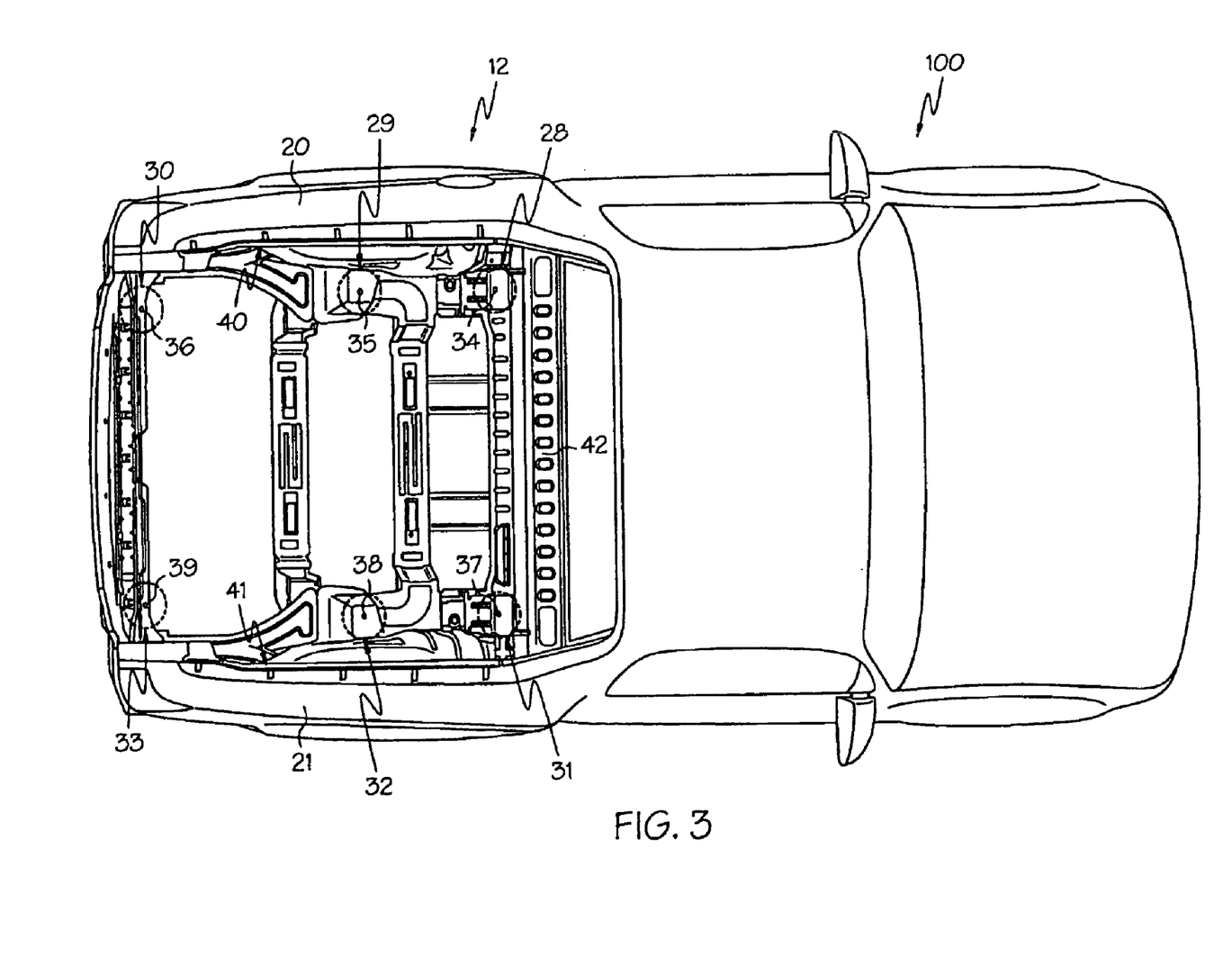
FIG. 3 is a top plan view depicting the pickup truck of FIG. 2 with certain components removed to expose an exemplary support structure.

As shown in FIG. 4, an exemplary bed system can include a left side member 18. The left side member 18 can include a surface 18E that is configured to directly contact cargo within the truck bed 12 and to assist in restraining the cargo within the truck bed 12. The left side member 18 is depicted as having a plurality of apertures (e.g., 59, 69) to facilitate the securement of the left side member 18 against a support component (e.g., the left support component 40, as depicted in FIG. 3). However, it should be understood that in alternate embodiments, one or more of these apertures might not be present, such as when certain alternate securement mechanisms (e.g., adhesives, screws, rivets, push-pins, or the like) are employed to secure the left side member 18 in place. Furthermore, the left side member 18 can include one or more edge portions extending at least partially along its outer periphery. For example, the left side member 18 is depicted in FIG. 4 as including a lower edge portion 18A, a front edge portion 18B, an upper edge portion 18C, and a rear edge portion 18D. Although the left side member 18 is depicted as comprising a single member extending vertically from the bed floor 14 to the left bed rail member 24, and further extending horizontally from the headboard member 23 to a position adjacent to the rear of the truck bed portion 12, it should be understood that an exemplary left side member could alternatively comprise one or more separate members that are each respectively configured to vertically and/or horizontally span only a portion of the area covered by the exemplary left side member 18.

An exemplary bed system can further include a right side member 19. The right side member 19 can include a surface 19E (best shown in FIG. 1) that is configured to directly contact cargo within the truck bed 12 and to assist in restraining the cargo within the truck bed 12. The right side member 19 can include a plurality of apertures in order to facilitate the securement of the right side member 19 against a portion of the truck bed 12 (e.g., the right support component 41, as shown in FIG. 3). However, it should be understood that in alternate embodiments, one or more of these apertures might not be present, such as when certain alternate securement mechanisms (e.g., adhesives, screws, rivets, push-pins, or the like) are employed to secure the right side member 19 in place. Furthermore, the right side member 19 can include one or more edge portions extending at least partially along its outer periphery. For example, the right side member 19 is depicted in FIG. 4 as having a lower edge portion 19A, a front edge portion 19B, an upper edge portion 19C, and a rear edge portion 19D. Although the right side member 19 is depicted as comprising a single member extending vertically from the bed floor 14 to the right bed rail member 25, and further extending horizontally from the headboard member 23 to a position adjacent to the rear of the truck bed portion 12, it should be understood that an exemplary right side member could alternatively comprise one or more separate members that are each respectively configured to vertically and/or horizontally span only a portion of the area covered by the exemplary right side member 19. In a further exemplary embodiment, part or all of an exemplary right side member might be integral with the bed floor, the headboard member, and/or the right bed rail member, for example.

An exemplary bed system can further include a headboard member 23. The headboard member can include a surface 23E that is configured to directly contact cargo within the truck bed 12 and to assist in restraining the cargo within the truck bed 12. The headboard member 23 can further include a plurality of apertures (e.g., 73, 78) to facilitate the securement of the headboard member 23 against a portion of the truck bed 12 (e.g., the headboard support component 42 as depicted in FIG. 3). However, it should be understood that in alternate embodiments, one or more of these apertures might not be present, such as when certain alternate securement mechanisms (e.g., adhesives, screws, rivets, push-pins, or the like) are employed to secure the headboard member 23 in place. Furthermore, the headboard member 23 can include one or more edge portions extending at least partially along its outer periphery. For example, the headboard member 23 is depicted in FIG. 4 as having a lower edge portion 23A, a left edge portion 23H, an upper edge portion 23C, and a right edge portion 23D. Although the headboard member 23 is depicted as comprising a single member extending vertically from the bed floor 14 to a position adjacent to the top of the truck bed portion 12, and further extending horizontally from the left side member 18 to the right side member 19, it should be understood that an exemplary headboard member could alternatively comprise one or more separate members that are each respectively configured to vertically and/or horizontally span only a portion of the area covered by the exemplary headboard member 23. In a further exemplary embodiment, part or all of an exemplary headboard member might be integral with the bed floor, the right side member, and/or the left side member, for example.

Figure 9:
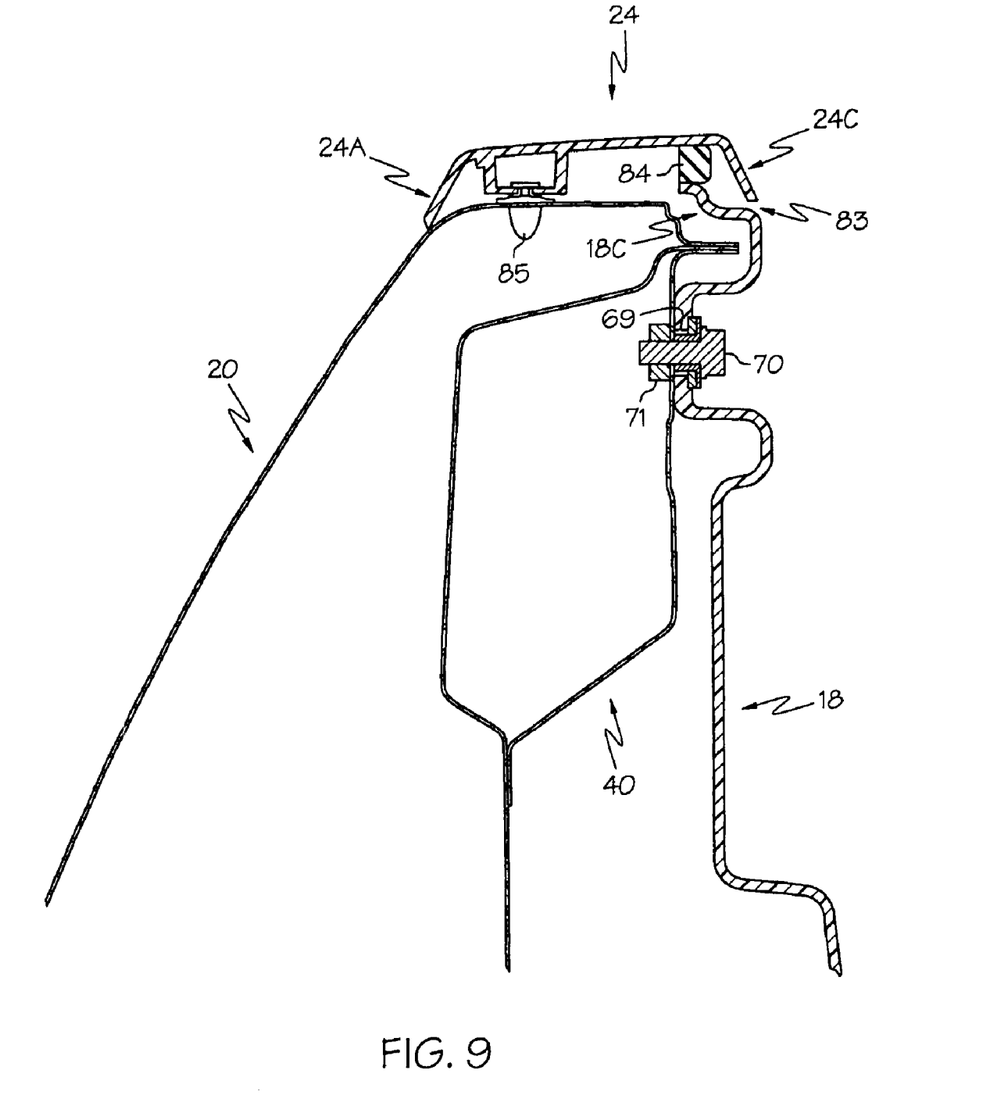
FIG. 9 is a partial cross-sectional view of an interface between a left side member and a bed rail member of the bed system depicted in FIG. 4.

An exemplary bed system can further include a left bed rail member 24. The left bed rail member 24 can be configured to substantially conceal the interface(s) between the left outer body panel 20, the left side member 18, and the left support component 40 (e.g., for preventing cargo, dirt and moisture from accessing such interface(s)). Furthermore, the left bed rail member 24 can include a surface 24E for directly contacting cargo. The left bed rail member 24 can be attached to the left outer body panel 20, the left side member 18, and/or the left support component 40 with one or more fasteners or adhesives, for example. More particularly, as shown in FIG. 9, the left bed rail member 24 can be secured against the left outer body panel 20 with one or more push-pin type fasteners (e.g., 85). Although the left bed rail member 24 is depicted in FIGS. 1, 2 and 4 as comprising a single elongated member, it should be understood that an exemplary left bed rail member could alternatively comprise a plurality of separate members that are each respectively configured to span only a portion of the area covered by the exemplary left bed rail member 24. Furthermore, the left bed rail member 24 can include one or more edge portions extending at least partially along its outer periphery. For example, the left bed rail member 24 can include a left edge portion 24A, a front edge portion 24B, a right edge portion 24C, and a rear edge portion 24D.

An exemplary bed system can further include a right bed rail member 25. The right bed rail member 25 can be configured to substantially conceal the interface(s) between the right outer body panel 21, the right side member 19, and the right support component 41 (e.g., for preventing cargo, dirt and moisture from accessing such interface(s)). Furthermore, the right bed rail member 25 can include a surface 25E for directly contacting cargo. The right bed rail member 25 can be attached to the right outer body panel 21, the right side member 19, and/or the right support component 41 with one or more fasteners or adhesives, for example. More particularly, the right bed rail member 25 can be secured against the right outer body panel 21 with one or more push-pin type fasteners. Although the right bed rail member 25 is depicted in FIGS. 1, 2 and 4 as comprising a single elongated member, it should be understood that an exemplary right bed rail member could alternatively comprise a plurality of separate members that are each respectively configured to span only a portion of the area covered by the exemplary right bed rail member 25. Furthermore, the right bed rail member 25 can include one or more edge portions extending at least partially along its outer periphery. For example, the right bed rail member 25 can include a left edge portion 25A, a front edge portion 25B, a right edge portion 25C, and a rear edge portion 25D.

In some embodiments, as depicted in FIG. 1, for example, a truck bed portion 12 might be provided with a tailgate 22. An exemplary bed system associated with such a truck bed portion 12 might further include a tailgate member (e.g., 22b shown in FIG. 1) that affixes to the tailgate 22 and is configured to directly contact cargo and to assist in restraining cargo within the truck bed portion 12 during movement of the pickup truck 100. Of course, it should be understood that a bed system in accordance with the present invention might not include a tailgate member, and might further be configured for association with a pickup truck that includes a net or cage in lieu of the tailgate 22, or perhaps does not include any such rear cargo restraint whatsoever.

The individual components of the bed system (e.g., the bed floor 14, the left side member 18, the right side member 19, the headboard member 23, the left bed rail member 24, the right bed rail member 25, and/or the tailgate member 22b) can be formed from any of a variety of materials such as, for example, steel, aluminum, plastic, fiberglass, composites, and/or a combination thereof. In one exemplary embodiment, an exemplary bed system can include a plurality of plastic members. For example, each of the bed floor 14, the left side member 18, the right side member 19, the headboard member 23, the left bed rail member 24, the right bed rail member 25, and the tailgate member 22b can comprise separate SMC (Sheet Molded Compound) components. One or more of these plastic members can be associated with integral or nonintegral metal reinforcement components. For example, metal braces can be glued with adhesive to the underside/backside of certain members (e.g., the bed floor 14).

Each of the members of the bed system can be secured against and/or relative to one or more support components. In one embodiment, a single support structure can integrally provide one or more of these support components, and the support structure can be adapted for securement in a fixed position relative to a pickup truck frame or unibody. This securement might be accomplished through welds, bolts or other fastening, for example. In another embodiment, the support structure might be integral with the pickup truck's frame or unibody. Hence, in such an embodiment, each of the support components for an exemplary bed system can be integrally provided by the pickup truck's frame or unibody. A suitable support component and/or support structure can comprise any of a variety of materials, including for example, plastic, fiberglass, steel, aluminum, a combination thereof, or the like.

In one specific embodiment, as shown in FIG. 3, the pickup truck 100 can include a support structure having a plurality of support components 28, 29, 30, 31, 32 and 33. Each of the support components 28, 29, 30, 31, 32 and 33 can be configured to provide subjacent support and/or specific attachment locations for the bed floor 14 (and the closure member 16, if present). Referencing FIGS. 2–4, the bed floor 14 can be assembled in a fixed position relative to the support structure, for example, by aligning apertures 44, 45, 46, 47, 48 and 49 in the bed floor 14 with apertures 34, 35, 36, 37, 38 and 39 in the respective support components 28, 29, 30, 31, 32, and 33, and then by inserting bolts or other fasteners through these aligned apertures. In this manner, the bed floor 14 can be secured to one or more support components (e.g., 28, 29, 30, 31, 32, and 33).

The support structure can also include additional support components to which other members of an exemplary bed system can be attached. For example, as shown in the embodiment of FIG. 3, the support structure can include a left support component 40 (e.g., for providing support for the left outer body panel 20, the left side rail member 24, and/or the left side member 18), a right support component 41 (e.g., for providing support for the right outer body panel 21, the right bed rail member 25, and/or the right side member 19), and a headboard support component 42 (e.g., for providing support for the headboard member 23). Hence, in the embodiment depicted by FIG. 3, a single support structure is shown to comprise support components to which each of the members of an exemplary bed system can be secured. It should be understood, however, that in alternate embodiments, individual support components might be separated from one another, and might accordingly not be part of a unitary support structure. In any event, the specific configuration of support components can vary significantly from one truck bed to another, and a bed system in accordance with the present invention can associate with virtually any of a substantial variety of suitable arrangements and/or combination of support components.

Figure 5:
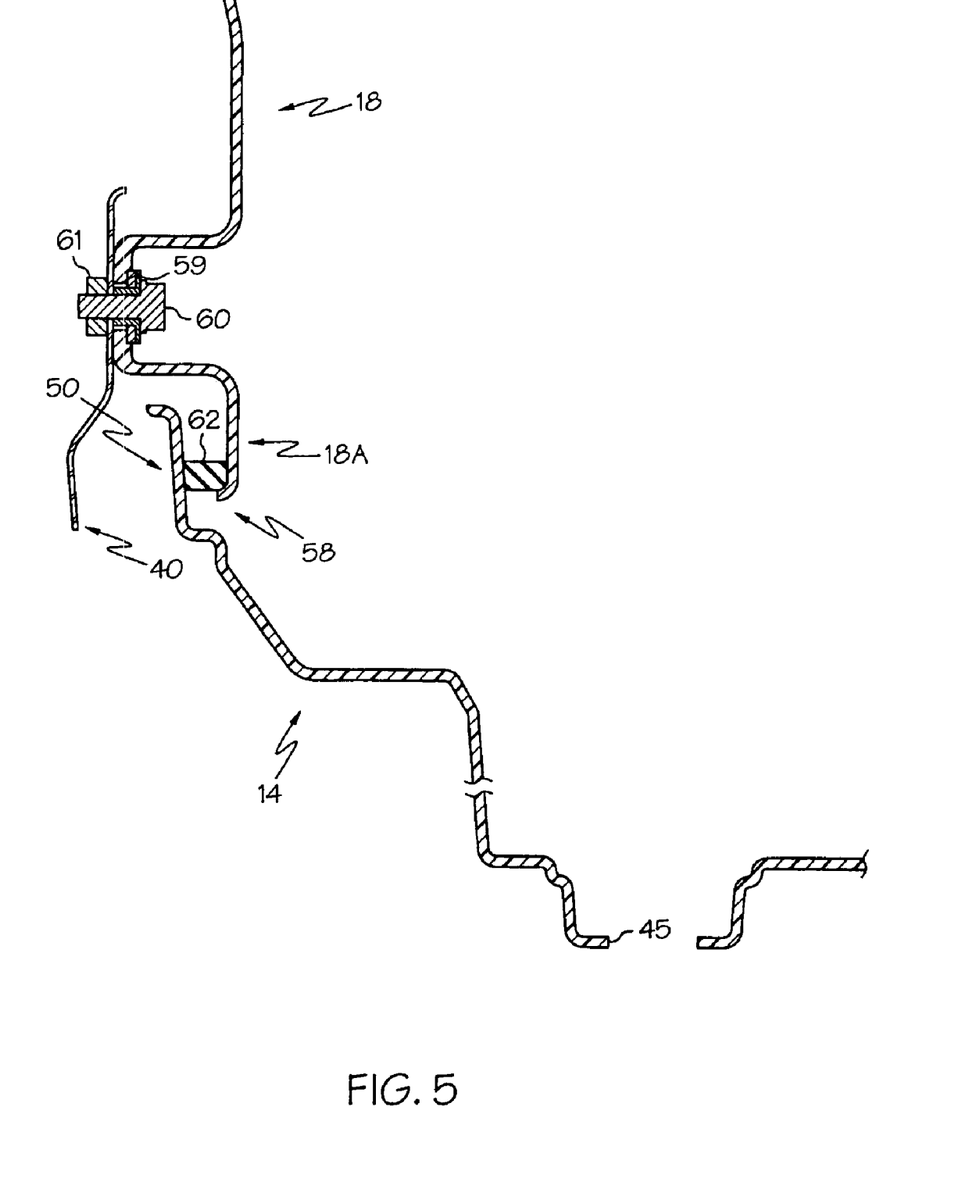
FIG. 5 is a partial cross-sectional view of an interface between a left side member and a bed floor of the bed system depicted in FIG. 4.

FIG. 5 depicts a partial cross-sectional view of an exemplary partially overlapping spaced relationship between the left side member 18 and the bed floor 14. More particularly, the left side member 18 is depicted in FIG. 5 as being secured to the left support component 40 with a fastener (e.g., bolt 60) inserted through an aperture 59 in the left side member 18. The bolt 60 engages a nut 61 that can be welded or otherwise affixed to the left support component 40. The bed floor 14 is depicted as having an aperture 45 suitable for receiving a fastener (not shown). A fastener inserted through the aperture 45 can be received into the aperture 35 of the bed floor support component 29, as depicted in FIG. 3, for example. In this manner, the left side member 18 can be secured to the left support component 40 and the bed floor 14 can be secured to the bed floor support component 29. However, it should be understood that any of a variety of suitable fasteners, adhesives and/or structural configurations can be provided to facilitate the securement of one or more members (e.g., the bed floor 14, the left side member 18, the right side member 19, the headboard member 23, the left bed rail member 24, the right bed rail member 25, and the tailgate member 22b) to one or more support components, and that the specific examples provided herein are merely exemplary thereof.

As further depicted by FIG. 5, the lower edge portion 18A of the left side member 18 can be configured to partially overlap the left edge portion 50 of the bed floor 14 at an interface 58. Accordingly, at least a portion of the lower edge portion 18A can be oriented in at least a partially overlapping spaced relationship with respect to at least a portion of the left edge portion 50 at the interface 58. A cushioning element 62 can be disposed within the interface 58 to facilitate a flexible relationship between the lower edge portion 18A and the left side portion 50, and to accordingly facilitate relative movement therebetween. As depicted in FIG. 5, the cushioning element 62 can be adhered to the lower edge portion 18A of the left side member 18. However, it should be understood that the cushioning element 62 could alternatively be adhered to the left edge portion 50 of the bed floor 14. The cushioning element 62 can be configured to contact both edge portions 18A and 50 even when uncompressed (as shown in FIG. 5). In alternative embodiments, the cushioning element 62 might only contact one of the two edge portions 18A, 50 while uncompressed.

The cushioning element 62 is operable to substantially prevent contact and/or frictional engagement (e.g., sliding) between two overlapping edge portions (e.g., 18A and 50) of respective members (e.g., 18, 14). This frictional engagement may occur in the absence of a cushioning element due to slight differences in the torsion of the vehicle and/or as a result of vibration during vehicular travel. Without a cushioning element, the two overlapping edge portions might directly contact each other and over time can wear upon each other at the point(s) of contact. Also, without a cushioning element, any dirt present at the point of contact between the two edge portions can act as an abrasive that can expedite the wearing of these edge portions. Such wearing can result in the premature failure of a bed assembly.

The cushioning element, when inserted at the interface between two overlapping edge portions, can substantially separate the edge portions (thus substantially preventing contact between the edge portions at the interface), and can further permit or facilitate relative movement between the edge portions at the interface while preventing excessive wearing to either of the edge portions. An exemplary cushioning element can be formed from any of a variety of resiliently compressible materials, including for example, rubber, foam (e.g., open-celled type foam), a combination thereof, or the like. Furthermore, an exemplary cushioning element can exhibit greater compressivity than either of the first and second members.

Figure 6:
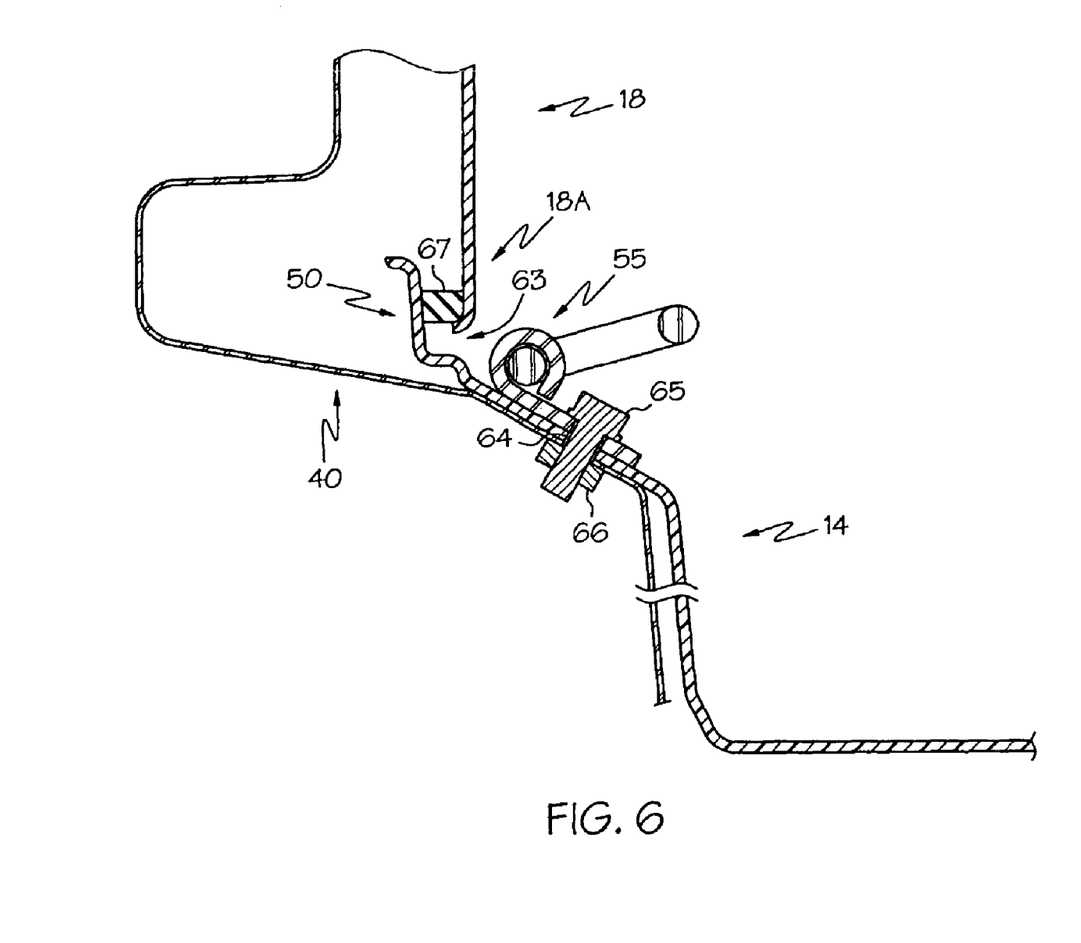
FIG. 6 is a partial cross-sectional view of a second embodiment of an interface between a left side member and a bed floor of the bed system depicted in FIG. 4.

FIG. 6 depicts another exemplary partially overlapping spaced relationship between the left side member 18 and the bed floor 14. The lower edge portion 18A of the left side member 18 is shown to overlap the left edge portion 50 of the bed floor 14 at an interface 63. A cushioning element 67 can be provided to maintain the edge portions 18A, 50 separate from each other and to facilitate relative movement therebetween. The cushioning element 67 can be configured to contact both edge portions 18A and 50 even when uncompressed (as shown in FIG. 6). In alternative embodiments, the cushioning element 67 might only contact one of the two edge portions 18A, 50 while uncompressed. The bed floor 14 is shown as being secured to the left support component 40 with a fastener (e.g., bolt 65) inserted through an aperture 64 in the bed floor 14. The bolt 65 is configured to engage a nut 66 that is welded or otherwise secured against the left support component 40. As further depicted in FIG. 6, the bolt 65 can be configured to further secure a cargo retaining device (e.g., left cargo hook 55) against the bed floor 14 of the truck bed portion. Although not depicted in FIG. 6, it should be understood that the left side member 18 can be secured against a portion of the truck bed portion 12 (e.g., left support component 40), such as has been previously described. An exemplary bed system might also include one or more additional cargo restraining devices (e.g., right cargo hook 56 depicted in FIG. 2) that can be secured to the truck bed in any of a variety of suitable configurations.

Figure 7:
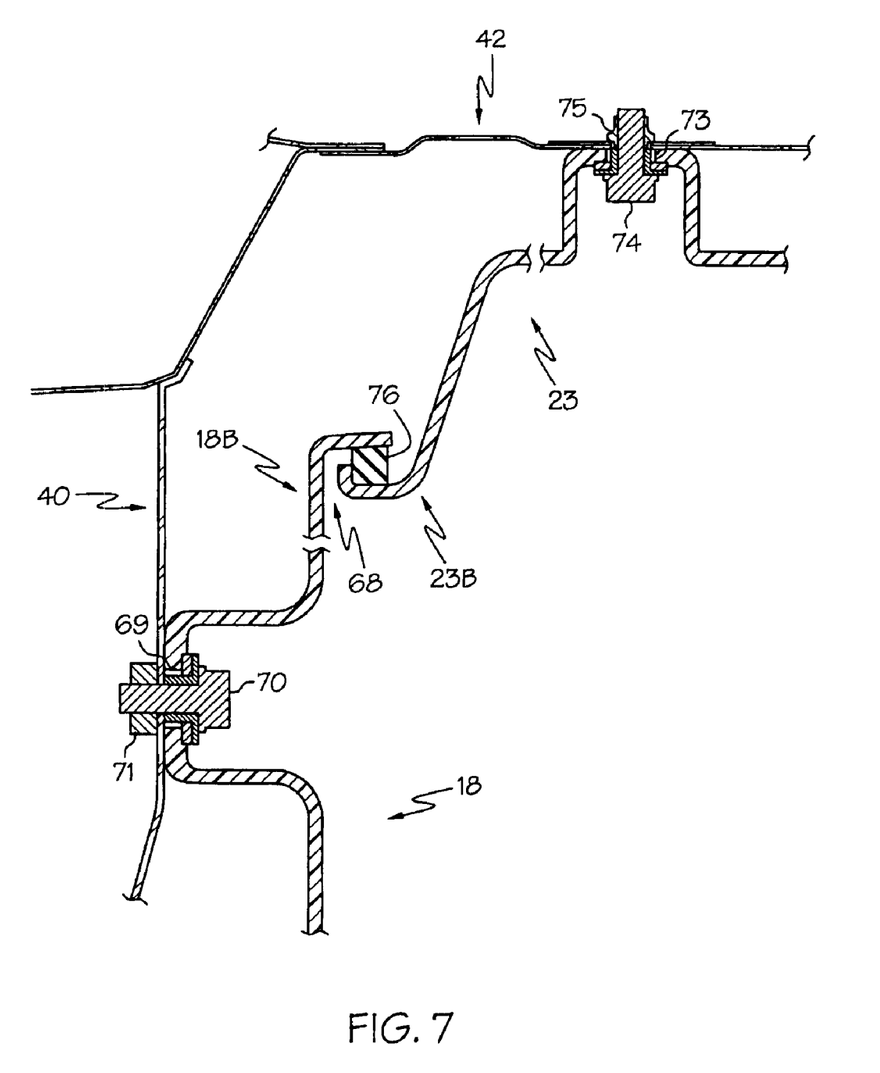
FIG. 7 is a partial cross-sectional view of an interface between a left side member and a headboard member of the bed system depicted in FIG. 4.

FIG. 7 depicts yet another exemplary partially overlapping spaced relationship between adjacent members. More particularly, an interface 68 is depicted between the overlapping front edge portion 18B of the left side member 18 and the left edge portion 23B of the headboard member 23. The left side member 18 is shown to secure against the left support component 40 with a bolt 70 inserted through an aperture 69 in the left side member 18. The bolt 70 interfaces a nut 71 that is welded or otherwise secured against the left support component 40. The headboard member 23 is shown as being secured to the headboard support component 42 with a bolt 74 inserted through an aperture 73. The bolt 74 is shown to interface a nut 75 that is welded or otherwise attached to the headboard support component 42. A cushioning element 76 can be provided at the interface 68 to maintain spacing between the edge portions 18B and 23B and to further facilitate movement therebetween. The cushioning element 76 can be configured to contact both edge portions 18B and 23B even when uncompressed (as shown in FIG. 7). In alternative embodiments, the cushioning element 76 might only contact one of the two edge portions 18B, 23B while uncompressed.

Figure 8:
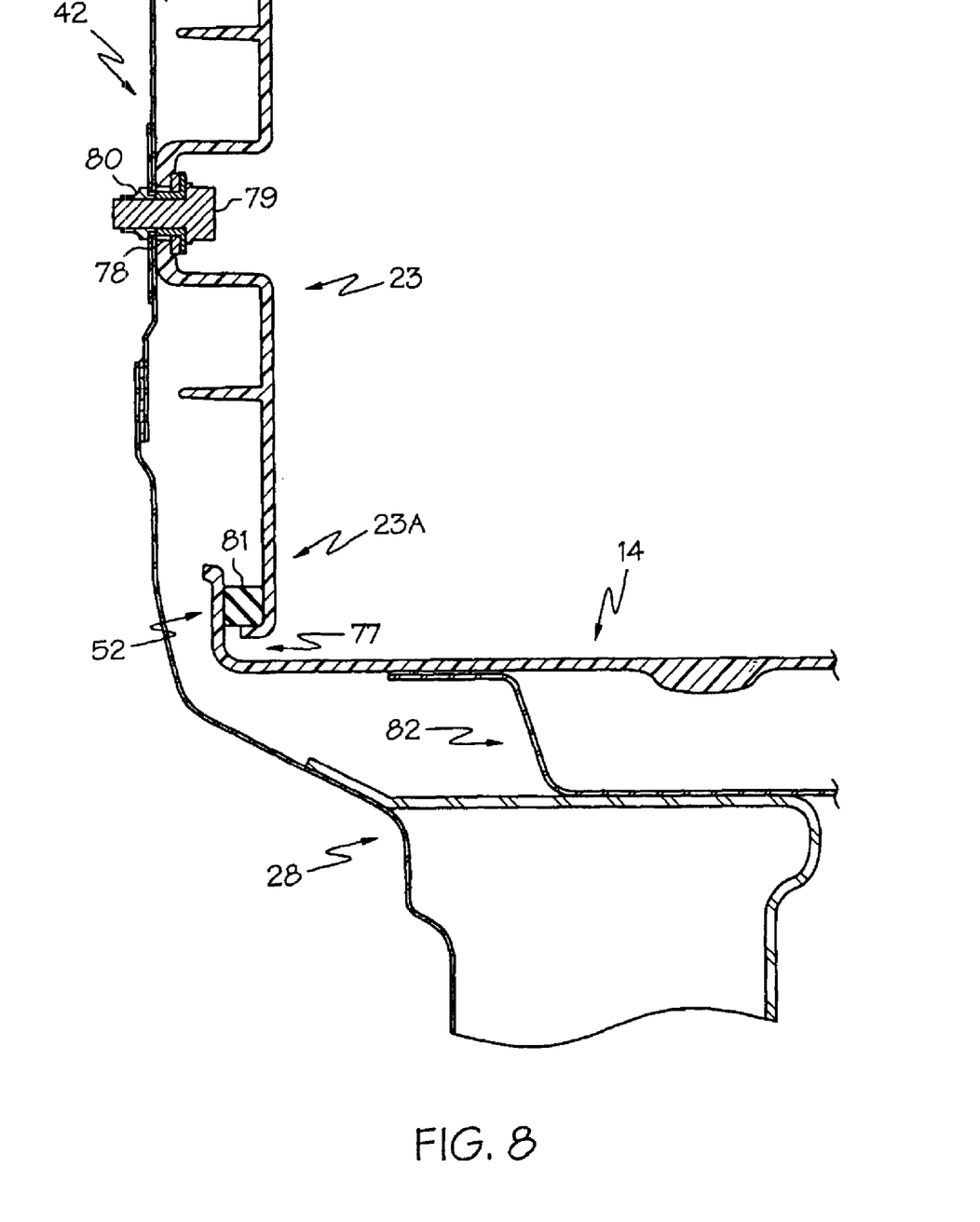
FIG. 8 is a partial cross-sectional view of an interface between a headboard member and a bed floor of the bed system depicted in FIG. 4.

FIG. 8 depicts still another exemplary partially overlapping spaced relationship between adjacent members. The headboard member 23 is shown as being secured against the headboard support component 42 with a bolt 79. More particularly, the bolt 79 extends through an aperture 78 in the headboard member 23 and into a nut 80 that is welded or otherwise associated with the headboard support component 42. The bed floor 14 is shown as being supported upon a support brace 82 that, in one embodiment, can be attached (e.g., with adhesive) to the bed floor 14. The support brace 82 can rest upon and/or fasten to the bed floor support component 28, for example. A cushioning element 81 is shown as being provided at the interface 77 between the overlapping lower edge portion 23A of the headboard member 23 and the front edge portion 52 of the bed floor 14. The cushioning element 81 can be configured to contact both edge portions 23A and 52 even when uncompressed (as shown in FIG. 8). In alternative embodiments, the cushioning element 81 might only contact one of the two edge portions 23A, 52 while uncompressed.

FIG. 9 depicts another exemplary partially overlapping spaced relationship between adjacent members. More particularly, the upper edge portion 18C of the left side member 18 is shown to partially overlap the right edge portion 24C of the left bed rail member 24 at an interface 83. A fastener (e.g., a bolt 70) can be provided to secure the left side member 18 to the left support component 40 by passing through an aperture 69 in the left side member 18 and into a nut 71 associated with the left support component 40. The left bed rail member 24 is shown as being secured against the left outer body panel 20 with one or more push-pins (e.g., 85). A cushioning element 84 can be provided at the interface 83 to separate the right edge portion 24C of the left bed rail member 24 from the upper edge portion 18C of the left side member 18. In this manner, the cushioning element 84 can substantially prevent unwanted contact between these two members at the interface 83, and any wearing resulting from such contact. The cushioning element 84 can be configured to contact both edge portions 18C and 24C even when uncompressed (as shown in FIG. 9). In alternative embodiments, the cushioning element 84 might only contact one of the two edge portions 18C, 24C while uncompressed.

Figure 10:
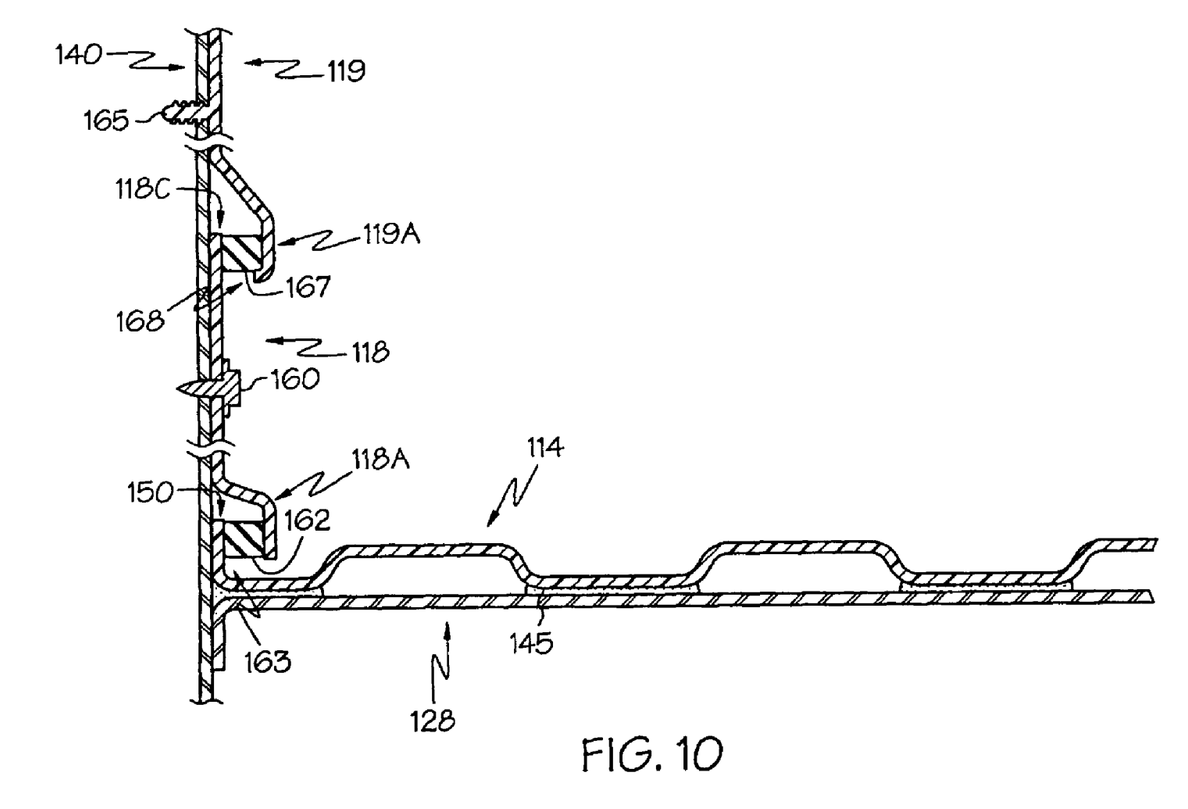
FIG. 10 is a partial cross-sectional view of interfaces between two left side members and a bed floor of an alternate exemplary bed system.

FIG. 10 depicts selected components of an alternate bed system constructed in accordance with the principles of the present invention that can, for example, be installed as an aftermarket-type product in a steel-lined bed of a conventional pickup truck. The steel-lined bed of a conventional pickup truck can include a bed floor support component 128 and a left support component 140. In an exemplary embodiment, the bed floor support component 128 can comprise a steel surface that is generally configured by the manufacturer of the pickup truck to directly contact and support cargo within the truck bed. Furthermore, the left support component 140 can comprise a steel surface that is configured by the manufacturer of the pickup truck to directly contact and support cargo within the truck bed. A bed floor 114 (e.g., formed from plastic) can be placed atop the bed floor support component 128 such that it receives subjacent support from the bed floor support component 128. In one exemplary embodiment, the bed floor 114 might not be attached to the bed floor support component 128, but might merely rest thereon or be pressed into position thereon. However, in other embodiments, one or more adhesives (e.g., 145) or other fasteners (e.g., bolts, screws) can be provided to secure or further secure the bed floor 114 against the bed floor support component 128. The bed floor 114 can be provided with a left edge portion 150 that, as shown in FIG. 10, can extend in an upwardly direction.

A first left side member 118 can be secured against the left support component 140 such as with one or more fasteners, including for example a self-tapping sheet metal screw 160 as shown in FIG. 10. A lower edge portion 118A of the first left side member 118 can extend in a partially overlapping spaced relationship with respect to the left edge portion 150 at an interface 163. A cushioning element 162 can be disposed at the interface 163 to separate the edge portions 150 and 118A. The cushioning element 162 can be configured to contact both edge portions 150 and 118A even when uncompressed (as shown in FIG. 10). In alternative embodiments, the cushioning element 162 might only contact one of the two edge portions 150, 118A while uncompressed.

As shown in FIG. 10, a second left side member 119 can be provided vertically adjacent to the first left side member 118 and can be disposed substantially coplanarly with the first left side member 118. The second left side member 119 can include an integral push-pin 165 that is configured for insertion through an aperture in the left support component 140. However, it should be understood that other forms of non-integral fasteners can be used to secure one or more of the members of the bed system to one or more support components. A bottom portion 119A of the second left side member 119 is shown to at least partially overlap a top portion 118C of the first left side member 118 in a spaced relationship at an interface 168. A cushioning element 167 can be disposed within this interface to separate these edge portions 118C, 119A and to prevent unwanted wearing thereof. The cushioning element 167 can be configured to contact both edge portions 118C and 119A even when uncompressed (as shown in FIG. 10). In alternative embodiments, the cushioning element 167 might only contact one of the two edge portions 118C, 119A while uncompressed.

Many of the foregoing examples specifically disclose the use of a cushioning element at respective interfaces between the headboard member and the left side member, the left side member and the bed floor, and the left bed rail member and the left side member. It should be understood, however, that the same principles can similarly apply to the interfaces between the headboard member and the right side member, the right side member and the bed floor, and the right bed rail member and the right side member. These principles can further apply to interfaces between a tailgate member and the bed floor, the left side member, the right side member, the left bed rail member, and/or the right bed rail member. –In a first exemplary embodiment, a truck bed can include a bed system having one or more cushioning elements interfacing the bed floor with each of the left side member, the right side member, and the headboard member. In a second exemplary embodiment, in addition to the cushioning element(s) of the first exemplary embodiment, one or more cushioning elements can be provided to interface each of the left and right side members with the headboard member. In a third exemplary embodiment, in addition to the cushioning element(s) of the first and/or second exemplary embodiment(s), one or more cushioning elements can be provided to interface the left and right side members with the left and right bed rail members, respectively. In a fourth exemplary embodiment, however, a single cushioning element can be provided to interface edge portions of two substantially coplanar members (e.g., as depicted for example by members 118 and 119 in FIG. 10), but without having any cushioning elements being provided at any other interfaces between members.

Although FIGS. 5–10 depict a plurality of cushioning elements (e.g., 62, 67, 76, 81, 84, 162 and 167), it should be understood that some or all of these cushioning elements might comprise respective portions of a single cushioning element (e.g., an elongated cushioning element that is merely bent into position as appropriate). For example, a single cushioning element might be provided to extend and attach adjacent to one or more edges of a particular member's periphery. In still a further embodiment, a single cushioning element might be provided to extend and attach adjacent to the entire outer periphery of a particular member (e.g., a side member). Alternatively, a plurality of cushioning elements might be spaced from each other and attached adjacent to one or more edges of a particular member's periphery. In any event, the specific size, shape, material and configuration of the cushioning element(s) in an exemplary bed system will of course depend upon the specific configurations of the members and the desired interface(s) therebetween. Accordingly, it should be understood that a cushioning element can assume any of a wide variety of configurations that are suitable for preventing damaging contact between adjacent members at an interface.

The foregoing description of exemplary embodiments and examples of the invention has been presented for purposes of illustration and description. It is not intended to be exhaustive or limit the invention to the forms described. Numerous modifications are possible in light of the above teachings. Some of those modifications have been discussed, and others will be understood by those skilled in the art. The embodiments were chosen and described in order to best illustrate the principles of the invention and various embodiments as are suited to the particular use contemplated. It is hereby intended that the scope of the invention be defined by the claims appended hereto.

What is calmed is:

1. A bed system for a pickup truck, comprising:
   a first member adapted for securement to a first support component associated with a truck bed, the first member having a first surface for contacting cargo and having a first edge portion extending at least partially along the periphery of the first member;
   a second member adapted for securement to a second support component associated with a truck bed, the second member having a second surface for contacting cargo and having a second edge portion extending at least partially along the periphery of the second member, at least a portion of the second edge portion being oriented in at least a partially overlapping spaced relationship to at least a portion of the first edge portion at an interface; and
   a cushioning element, the cushioning element being located between the overlapping first and second edge portions at the interface and being attached to not more than one of the first and second edge portions at the interface, the cushioning element being resiliently compressible and permitting relative movement between the first and second edge portions at the interface.

2. The bed system of claim 1 wherein the first member comprises a bed floor.

3. The bed system of claim 2 wherein the second member comprises a side wall member.

4. The bed system of claim 2 wherein the second member comprises a headboard member.

5. The bed system of claim 1 wherein the first member comprises a side wall member.

6. The bed system of claim 5 wherein the second member comprises a headboard member.

7. The bed system of claim 5 wherein the second member comprises a bed rail member.

8. The bed system of claim 1 wherein the first member is secured to the first support component with at least one fastener.

9. The bed system of claim 8 wherein said fastener comprises a bolt.

10. The bed system of claim 8 wherein said fastener is integral with the first member.

11. The bed system of claim 1 wherein the first member is secured to the first support component with an adhesive.

12. The bed system of claim 1 wherein the first member comprises plastic.

13. The bed system of claim 12 wherein the second member comprises plastic.

14. The bed system of claim 1 wherein the first support component is integral with a pickup truck unibody.

15. The bed system of claim 14 wherein the second support component is integral with a pickup truck unibody.

16. The bed system of claim 1 wherein the first support component comprises metal.

17. The bed system of claim 16 wherein the second support component comprises metal.

18. The bed system of claim 1 wherein the first support component is integral with the second support component.

19. The bed system of claim 1 wherein the cushioning element comprises open-celled foam.

20. The bed system of claim 1 wherein the cushioning element comprises rubber.

21. The bed system of claim 1 wherein the cushioning element exhibits greater compressivity than does either of the first and second members.

22. The bed system of claim 1 wherein the cushioning element substantially prevents the first member from contacting the second member at the interface.

23. The bed system of claim 1 wherein the first and second members are disposed substantially coplanarly.

24. A bed system for a pickup truck, comprising:
a first member adapted for securement to a first support component associated with a truck bed, the first member having a first surface for contacting cargo and having a first edge portion extending at least partially along the periphery of the first member;
a bed floor adapted for receiving subjacent support from a second support component associated with a truck bed, the bed floor having a second surface for contacting cargo and having a second edge portion extending at least partially along the periphery of the bed floor, at least a portion of the second edge portion being oriented in at least a partially overlapping spaced relationship to at least a portion of the first edge portion at an interface; and
a cushioning element, the cushioning element being located between the overlapping first and second edge portions at the interface and being attached to not more than one of the first and second edge portions at the interface, the cushioning element being resiliently compressible and permitting relative movement between the first and second edge portions at the interface.

25. A bed system for a pickup truck, comprising;
a left side member adapted for securement to a first support component associated with a truck bed, the left side member having a first surface for contacting cargo and having a first edge portion extending at least partially along the periphery of the left side member;
a right side member adapted for securement to a second support component associated with a truck bed, the right side member having a second surface for contacting cargo and having a second edge portion extending at least partially along the periphery of the right side member;
a bed floor adapted for receiving subjacent support from a third support component associated with a truck bed, the bed floor having a third surface for contacting cargo and having third and fourth edge portions each extending partially along the periphery of the bed floor, at least a portion of the third edge portion being oriented in at least a partially overlapping spaced relationship to at least a portion of the first edge portion at a first interface, at least a portion of the fourth edge portion being oriented in at least a partially overlapping spaced relationship to at least a portion of the second edge portion at a second interface;
a first cushioning element being located between the overlapping first and third edge portions at the first interface, the first cushioning element being resiliently compressible and being attached to not more than one of the first and third edge portions at the first interface, the first cushioning element permitting relative movement between the first and third edge portions at the first interface; and
a second cushioning element being located between the overlapping second and fourth edge portions at the second interface, the second cushioning element being resiliently compressible and being attached to not more than one of the second and fourth edge portions at the second interface, the second cushioning element permitting relative movement between the second and fourth edge portions at the second interface.

* * * * *

UNITED STATES PATENT AND TRADEMARK OFFICE
CERTIFICATE OF CORRECTION

PATENT NO. : 6,986,540 B2
DATED : January 17, 2006
INVENTOR(S) : Augustine et al.

It is certified that error appears in the above-identified patent and that said Letters Patent is hereby corrected as shown below:

Column 5,
Line 57, change "23H" to -- 23B --.

Column 11,
Line 42, change "-In" to -- In --.

Column 12,
Line 28, change "calmed" to -- claimed --.

Column 14,
Line 6, change "comprising;" to -- comprising: --.

Signed and Sealed this

Twenty-eighth Day of March, 2006

JON W. DUDAS
*Director of the United States Patent and Trademark Office*